(12) United States Patent
Suzuki et al.

(10) Patent No.: US 7,812,315 B2
(45) Date of Patent: Oct. 12, 2010

(54) RADIATION IMAGE CONVERSION PANEL, SCINTILLATOR PANEL, AND RADIATION IMAGE SENSOR

(75) Inventors: Takaharu Suzuki, Hamamatsu (JP); Yutaka Kusuyama, Hamamatsu (JP); Masanori Yamashita, Hamamatsu (JP); Kazuhiro Shirakawa, Hamamatsu (JP); Toshio Takabayashi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 129 days.

(21) Appl. No.: 12/268,080

(22) Filed: Nov. 10, 2008

(65) Prior Publication Data
US 2009/0072160 A1 Mar. 19, 2009

Related U.S. Application Data

(63) Continuation of application No. 11/812,233, filed on Jun. 15, 2007, now Pat. No. 7,468,514.

(51) Int. Cl.
*G01T 1/20* (2006.01)
*G03B 42/08* (2006.01)
(52) U.S. Cl. .................................. 250/370.09
(58) Field of Classification Search ................. 250/368, 250/370.09, 370.11
See application file for complete search history.

(56) References Cited

U.S. PATENT DOCUMENTS

| 4,769,549 | A | 9/1988 | Tsuchino et al. |
| 4,873,708 | A | 10/1989 | Cusano et al. |
| 6,429,430 | B2 | 8/2002 | Sato et al. |
| 6,469,307 | B2 | 10/2002 | Takabayashi et al. |
| 6,692,836 | B2 | 2/2004 | Reichert et al. |
| 6,753,531 | B2 | 6/2004 | Homme et al. |
| 6,762,420 | B2 | 7/2004 | Homme et al. |
| 6,777,690 | B2 | 8/2004 | Homme et al. |
| 6,835,936 | B2 | 12/2004 | Okada et al. |
| 6,849,336 | B2 | 2/2005 | Homme et al. |
| 7,034,306 | B2 | 4/2006 | Homme et al. |
| 7,070,658 | B2 | 7/2006 | Guido et al. |

(Continued)

FOREIGN PATENT DOCUMENTS

CN 1347507 5/2002

(Continued)

OTHER PUBLICATIONS

Michael F. Weber et al., "Giant Birefringent Optics in Multilayer Polymer Mirrors," Science Mar. 31, 2000, vol. 287, No. 5462, pp. 2451-2456.

(Continued)

*Primary Examiner*—David P Porta
*Assistant Examiner*—Mark R Gaworecki
(74) *Attorney, Agent, or Firm*—Drinker Biddle & Reath LLP

(57) ABSTRACT

The radiation image conversion panel in accordance with the present invention has an aluminum substrate; an alumite layer formed on a surface of the aluminum substrate; a metal film, provided on the alumite layer, having a radiation transparency and a light reflectivity; a protective film covering the metal film and having a radiation transparency and a light transparency; and a converting part provided on the protective film and adapted to convert a radiation image.

17 Claims, 14 Drawing Sheets

U.S. PATENT DOCUMENTS

| | | |
|---|---|---|
| 7,087,908 B2 | 8/2006 | Homme |
| 7,141,803 B2 | 11/2006 | Homme |
| 2001/0030291 A1 | 10/2001 | Homme et al. |
| 2002/0017613 A1 | 2/2002 | Homme et al. |
| 2002/0076568 A1 | 6/2002 | Reichert et al. |
| 2003/0143424 A1 | 7/2003 | Steklenski et al. |
| 2003/0160185 A1 | 8/2003 | Homme |
| 2005/0133731 A1 | 6/2005 | Matsumoto et al. |
| 2006/0060792 A1 | 3/2006 | Matsumoto et al. |
| 2006/0263521 A1 | 11/2006 | Sato et al. |
| 2008/0036022 A1 | 2/2008 | Hwang et al. |

FOREIGN PATENT DOCUMENTS

| | | |
|---|---|---|
| JP | 56-89702 | 7/1981 |
| JP | 61-73901 | 4/1986 |
| JP | 1-131500 | 5/1989 |
| JP | 4-118599 | 4/1992 |
| JP | 2000-356679 | 12/2000 |
| JP | 2003-262700 | 9/2003 |
| JP | 2004-279428 | 10/2004 |
| JP | 2004-294137 | 10/2004 |
| JP | 2004-325126 | 11/2004 |
| JP | 2005-91221 | 4/2005 |
| JP | 2005-172511 | 6/2005 |
| JP | 2006-078472 | 3/2006 |
| JP | 2006-113007 | 4/2006 |
| JP | 2006-119124 | 5/2006 |
| JP | 2006-189377 | 7/2006 |
| JP | 2006-220439 | 8/2006 |
| JP | 2006-267013 | 10/2006 |
| JP | 2007-040836 | 2/2007 |
| KR | 2003-0072606 | 9/2003 |
| KR | 2006-0012034 | 2/2006 |
| KR | 10-0745991 | 8/2007 |
| RU | 2 181 491 | 4/2002 |
| RU | 2 298 813 | 5/2007 |
| WO | WO 00/63722 | 10/2000 |
| WO | WO 2006/049183 | 5/2006 |

OTHER PUBLICATIONS

U.S. Office Action issued on Jan. 28, 2008 in U.S. Appl. No. 11/812,234, filed Jun. 15, 2007.

U.S. Appl. No. 11/812,234, filed Jun. 15, 2007, Takaharu Suzuki et al.

J. Anthony Seibert et al., "Evaluation of an optically coupled CCD digital radiography system," Medical Imaging 2005: Physics of Medical Imaging, Proceedings of SPIE, vol. 5745, pp. 458-467.

RADIATION IMAGE CONVERSION PANEL, SCINTILLATOR PANEL, AND RADIATION IMAGE SENSOR

This is a continuation application of copending application Ser. No. 11/812,233, filed on Jun. 15, 2007, which is incorporated by reference herein in its entirety.

BACKGROUND OF THE INVENTION

1. Field of the Invention

The present invention relates to a radiation image conversion panel, a scintillator panel, and a radiation image sensor which are used in medical and industrial x-ray imaging and the like.

2. Related Background Art

While x-ray sensitive films have conventionally been in use for medical and industrial x-ray imaging, radiation imaging systems using radiation detectors have been coming into widespread use from the viewpoint of their convenience and storability of imaging results. In such a radiation imaging system, pixel data formed by two-dimensional radiations are acquired by a radiation detector as an electric signal, which is then processed by a processor, so as to be displayed on a monitor.

Known as a typical radiation detector is one having a structure bonding a radiation image conversion panel (which will be referred to as "scintillator panel" in the following as the case may be), in which a scintillator for converting a radiation into visible light is formed on a substrate such as aluminum, glass, or fused silica, to an image pickup device. In this radiation detector, a radiation incident thereon from the substrate side is converted into light by the scintillator, and thus obtained light is detected by the image pickup device.

In the radiation image conversion panels disclosed in Japanese Patent Application Laid-Open Nos. 2006-113007 and HEI 4-118599, a stimulable phosphor is formed on an aluminum substrate having a surface formed with an alumite layer. The radiation image conversion panel having a stimulable phosphor formed on a substrate will be referred to as "imaging plate" in the following as the case may be.

SUMMARY OF THE INVENTION

In the above-mentioned radiation image conversion panel, however, the alumite layer has a low reflectance for the light emitted from a scintillator or a phosphor such as stimulable phosphor, whereby the radiation image conversion panel may fail to attain a sufficiently high luminance. Also, cracks, pinholes, and the like may be formed in the alumite layer by the heat generated when vapor-depositing the scintillator or stimulable phosphor onto the aluminum substrate, for example. As a result, the aluminum substrate and an alkali halide scintillator or stimulable phosphor may react with each other, thereby corroding the aluminum substrate. Though resistant against the corrosion, the alumite layer may corrode by reacting with the scintillator. The corrosion affects resulting images. Even if only a minute point is corroded, the reliability of a captured image utilized for an image analysis will deteriorate. The corrosion may increase as time passes. While the radiation image conversion panel is required to have uniform luminance and resolution characteristics within the substrate surface, the substrate is harder to manufacture as it is larger in size.

In view of the circumstances mentioned above, it is an object of the present invention to provide a radiation image conversion panel, a scintillator panel, and a radiation image sensor which can prevent aluminum substrates from corroding, while having a high luminance.

For solving the problem mentioned above, the radiation image conversion panel in accordance with the present invention comprises an aluminum substrate; an alumite layer formed on a surface of the aluminum substrate; a metal film, provided on the alumite layer, having a radiation transparency and a light reflectivity; a protective film covering the metal film and having a radiation transparency and a light transparency; and a converting part provided on the protective film and adapted to convert a radiation image.

The scintillator panel in accordance with the present invention comprises an aluminum substrate; an alumite layer formed on a surface of the aluminum substrate; a metal film, provided on the alumite layer, having a radiation transparency and a light reflectivity; a protective film covering the metal film and having a radiation transparency and a light transparency; and a scintillator provided on the protective film.

The radiation image sensor in accordance with the present invention comprises a radiation image conversion panel including an aluminum substrate, an alumite layer formed on a surface of the aluminum substrate, a metal film which is provided on the alumite layer and has a radiation transparency and a light reflectivity, a protective film covering the metal film and having a radiation transparency and a light transparency, and a converting part provided on the protective film and adapted to convert a radiation image; and an image pickup device for converting light emitted from the converting part of the radiation image conversion panel into an electric signal.

DESCRIPTION OF THE PREFERRED EMBODIMENTS

Figure 1:
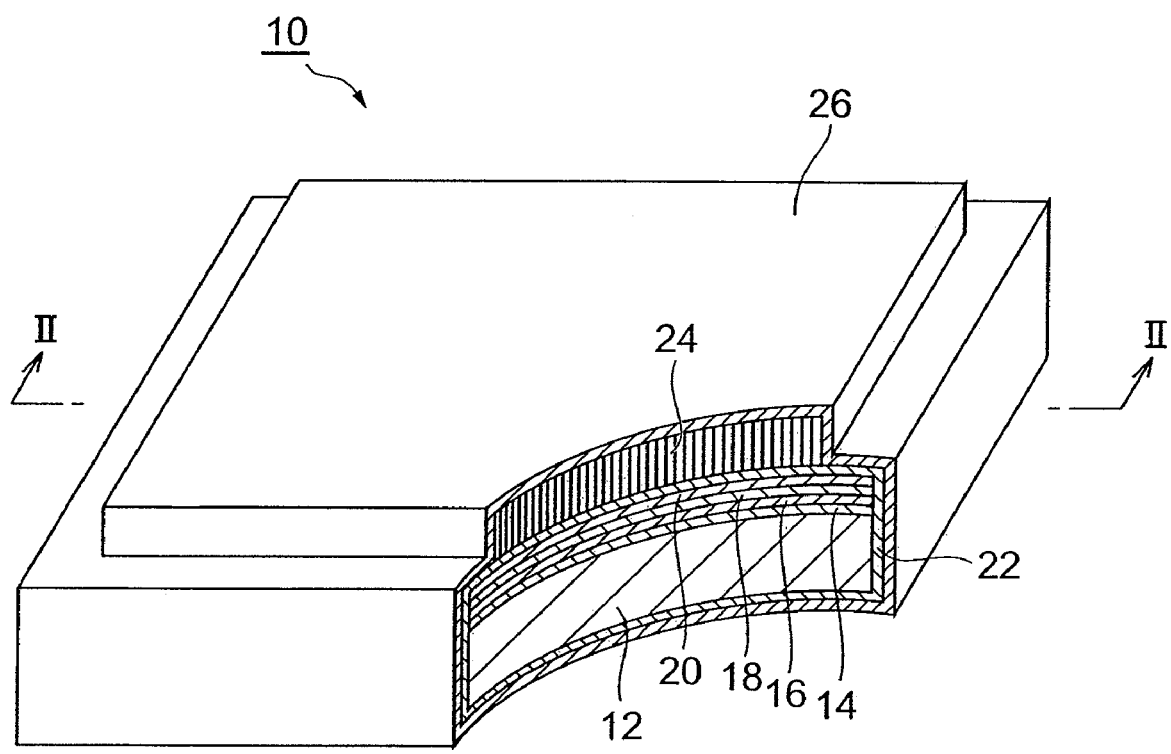
FIG. 1 is a partly broken perspective view schematically showing a scintillator panel in accordance with a first embodiment.

In the following, preferred embodiments of the present invention will be explained in detail with reference to the accompanying drawings. For easier understanding of the explanation, the same constituents in the drawings will be referred to with the same numerals whenever possible while omitting their overlapping descriptions. The dimensions of the drawings include parts exaggerated for explanations and do not always match dimensional ratios in practice.

First Embodiment

Figure 2:
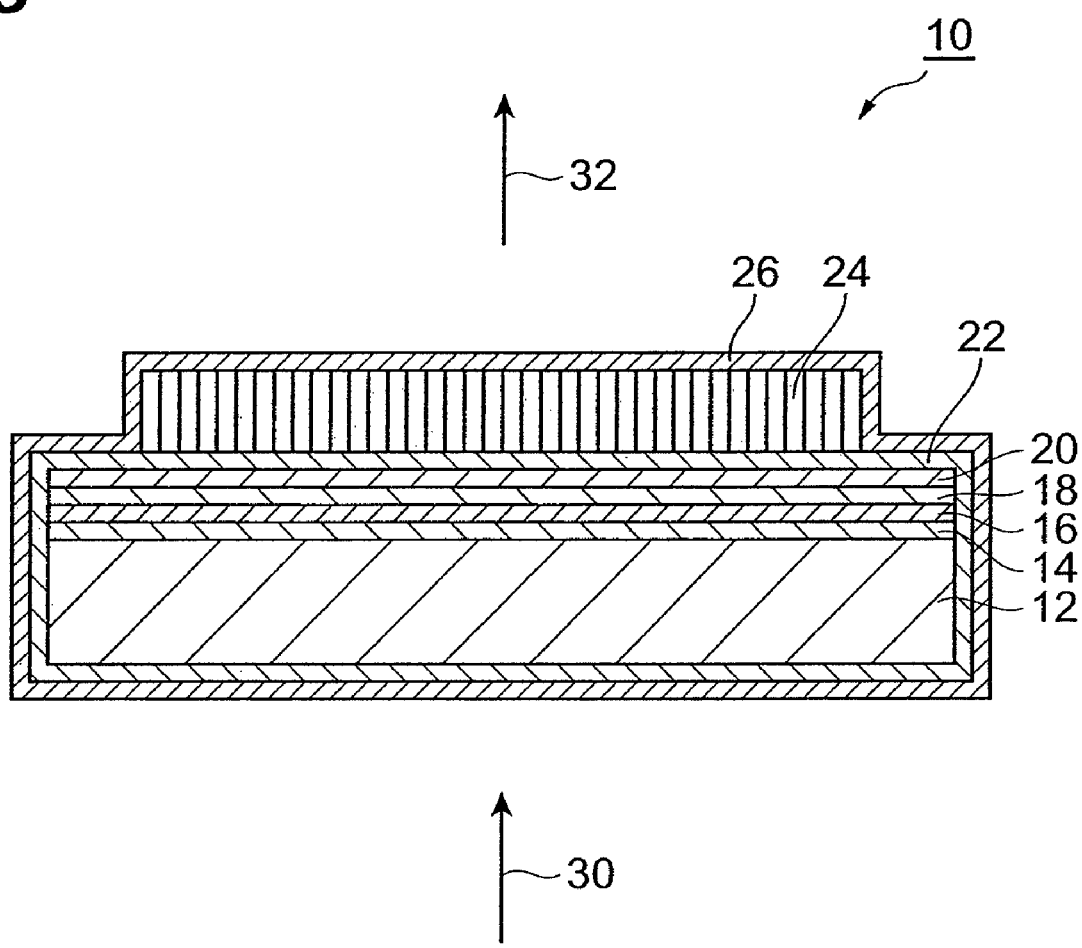
FIG. 2 is a sectional view taken along the line II-II shown in FIG. 1.

FIG. 1 is a partly broken perspective view showing a scintillator panel (an example of radiation image conversion panel) in accordance with a first embodiment. FIG. 2 is a sectional view taken along the line II-II shown in FIG. 1. As shown in FIGS. 1 and 2, the scintillator panel 10 comprises an aluminum substrate 12, an alumite layer 14 formed on a surface of the aluminum substrate 12, and an intermediate film 16 which is provided on the alumite layer 14 and has a radiation transparency. The alumite layer 14 and intermediate film 16 are in close contact with each other. The scintillator panel 10 also includes a metal film 18 which is provided on the intermediate film 16 and has a radiation transparency and a light reflectivity, an oxide layer 20 covering the metal film 18 and having a radiation transparency and a light transparency, a protective film 22 covering the oxide layer 20 and having a radiation transparency and a light transparency, and a scintillator 24 (an example of a converting part adapted to convert a radiation image) provided on the protective film 22. The intermediate film 16, metal film 18, oxide layer 20, protective film 22, and scintillator 24 are in close contact with each other.

In this embodiment, the aluminum substrate 12, alumite layer 14, intermediate film 16, metal film 18, and oxide layer 20 are totally sealed with the protective film 22. The protective film 22 prevents the metal film 18 from corroding because of pinholes and the like formed in the oxide layer 20. Also, the aluminum substrate 12, alumite layer 14, intermediate film 16, metal film 18, oxide layer 20, protective film 22, and scintillator 24 are totally sealed with a protective film 26.

When a radiation 30 such as x-ray is incident on the scintillator 24 from the aluminum substrate 12 side, light 32 such as visible light is emitted from the scintillator 24. Therefore, when a radiation image is incident on the scintillator panel 10, the scintillator 24 converts the radiation image into a light image. The radiation 30 successively passes through the protective film 26, protective film 22, aluminum substrate 12, alumite layer 14, intermediate film 16, metal film 18, oxide layer 20, and protective film 22, thereby reaching the scintillator 24. The light 32 emitted from the scintillator 24 is transmitted through the protective film 26 to the outside, while passing through the protective film 22, so as to be reflected by the metal film 18 and oxide layer 20 to the outside. The scintillator panel 10 is used for medical and industrial x-ray imaging and the like.

The aluminum substrate 12 is a substrate mainly made of aluminum, but may contain impurities and the like. Preferably, the thickness of the aluminum substrate 12 is 0.3 to 1.0 mm. When the thickness of the aluminum substrate 12 is less than 0.3 mm, the scintillator 24 tends to be easy to peel off as the aluminum substrate 12 bends. When the thickness of the aluminum substrate 12 exceeds 1.0 mm, the transmittance of the radiation 30 tends to decrease.

Layer 14 is made of porous aluminum oxide formed by anodic oxidation of aluminum (i.e. alumite). The alumite layer 14 makes it harder to damage the aluminum substrate 12. If the aluminum substrate 12 is damaged, the reflectance of the aluminum substrate 12 will be less than a desirable value, whereby no uniform reflectance will be obtained within the surface of the aluminum substrate 12. Whether the aluminum substrate 12 is damaged or not can be inspected visually, for example. The alumite layer 14 may be formed on the aluminum substrate 12 on only one side to be formed with the scintillator 24, on both sides of the aluminum substrate 12, or such as to cover the aluminum substrate 12 as a whole. Forming the alumite layer 14 on both sides of the aluminum substrate 12 can reduce the warpage and flexure of the aluminum substrate 12, and thus can prevent the scintillator 24 from being unevenly vapor-deposited. Forming the alumite layer 14 can also erase streaks occurring when forming the aluminum substrate 12 by rolling. Therefore, even when a reflecting film (metal film 18 and oxide layer 20) is formed on the aluminum substrate 12, a uniform reflectance can be obtained within the surface of the aluminum substrate 12 in the reflecting film. Preferably, the thickness of the alumite layer 14 is 10 to 5000 nm. When the thickness of the alumite layer 14 is less than 10 nm, the damage prevention effect of the aluminum substrate 12 tends to decrease. When the thickness of the alumite layer 14 exceeds 5000 nm, the alumite layer 14 tends to peel off in particular in corner parts of the aluminum substrate 12, thereby causing large cracks in the alumite layer 14 and deteriorating the moisture resistance of the alumite layer 14. In one example, the thickness of the alumite layer 14 is 1000 nm. The thickness of the alumite layer 14 is appropriately determined according to the size and thickness of the aluminum substrate 12.

Figure 3:
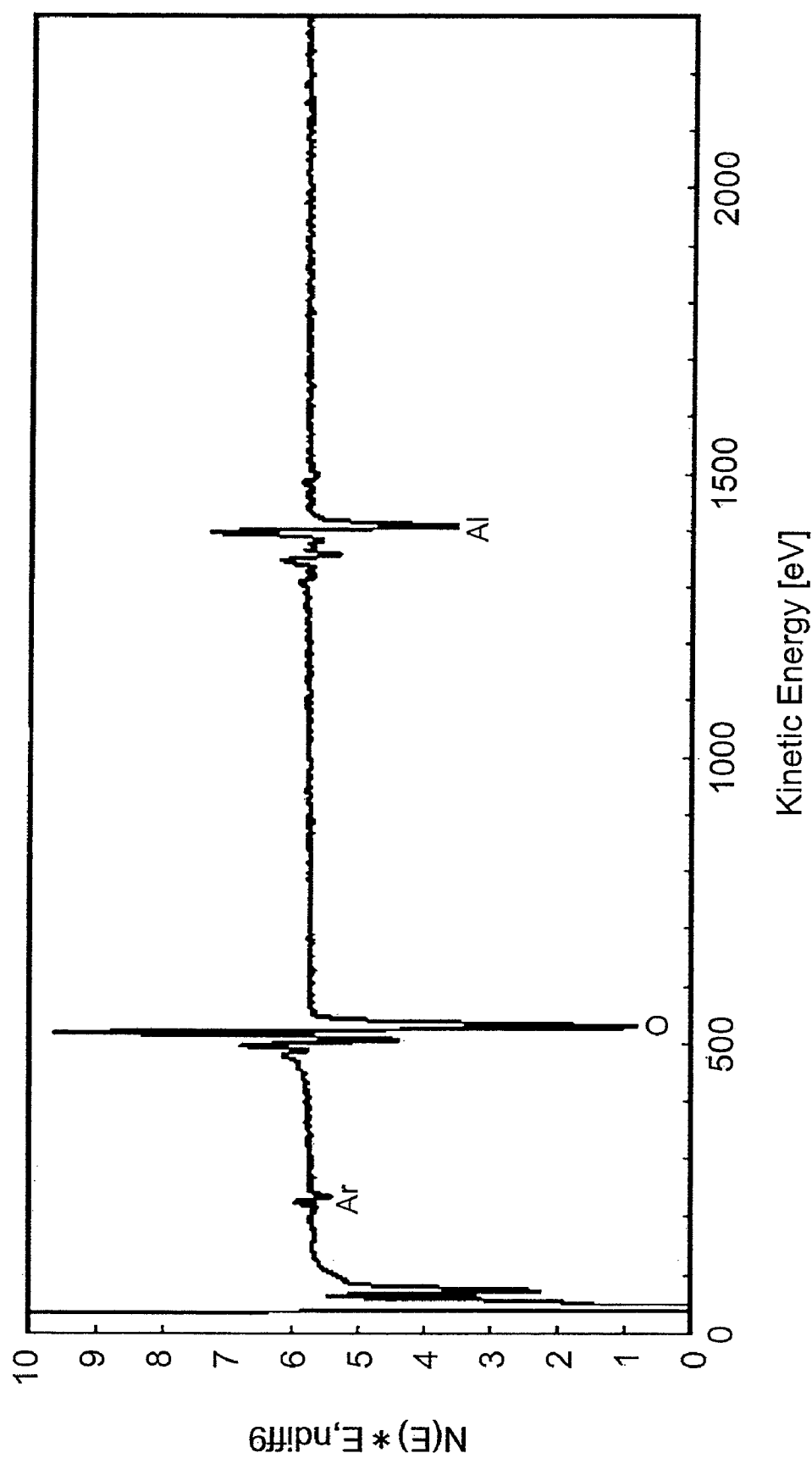
FIG. 3 is a graph showing an example of AES spectrum of the alumite layer in the scintillator panel in accordance with the first embodiment.

FIG. 3 is a graph showing an example of AES spectrum of the alumite layer in the scintillator panel in accordance with the first embodiment. This example conducts an element analysis in the thickness direction of the alumite layer 14 by sputter-etching the alumite layer 14 with argon ions for 31 minutes. In this case, aluminum, oxygen, and argon are detected. Here, argon derives from the argon ions at the time of sputter etching, and thus is not an element contained in the alumite layer 14. Therefore, the alumite layer 14 in this example contains aluminum and oxygen.

Reference will be made to FIGS. 1 and 2 again. The intermediate film 16 and protective films 22 and 26 are organic or inorganic films, which may be made of materials different from each other or the same material. The intermediate film 16 and protective films 22 and 26 are made of polyparaxylylene, for example, but may also be of xylylene-based materials such as polymonochloroparaxylylene, polydichloroparaxylylene, polytetrachloroparaxylylene, polyfluoroparaxylylene, polydimethylparaxylylene, and polydiethylparaxylylene. The intermediate film 16 and protective films 22 and 26 may be made of polyurea, polyimide, and the like, for example, or inorganic materials such as LiF, $MgF_2$, $SiO_2$, $Al_2O_3$, $TiO_2$, MgO, and SiN. The intermediate film 16 and protective films 22 and 26 may also be formed by combining inorganic and organic films. In one example, the intermediate film 16 and protective films 22 and 26 have a thickness of 10 μm each. The intermediate film 16 reduces minute irregularities of the alumite layer 14, thereby advantageously acting for forming the metal film 18 having a uniform thickness on the alumite layer 14.

The metal film 18 is constructed by Al, for example, but may also be made of Ag, Cr, Cu, Ni, Ti, Mg, Rh, Pt, Au, or the like. Among them, Al or Ag is preferred. The metal film 18 may also contain elements such as oxygen other than metal elements. The metal film 18 may be constituted by a plurality of metal films, e.g., a Cr film and an Au film provided on the Cr film. Preferably, the thickness of the metal film 18 is 50 to 200 nm. In one example, the thickness of the metal film 18 is 70 nm. When an aluminum film is used as the metal film 18, it may be analyzed by AES (Auger Electron Spectroscopy) as an incomplete aluminum oxide depending on the vapor deposition condition and the processing after the vapor deposition.

Figure 4:
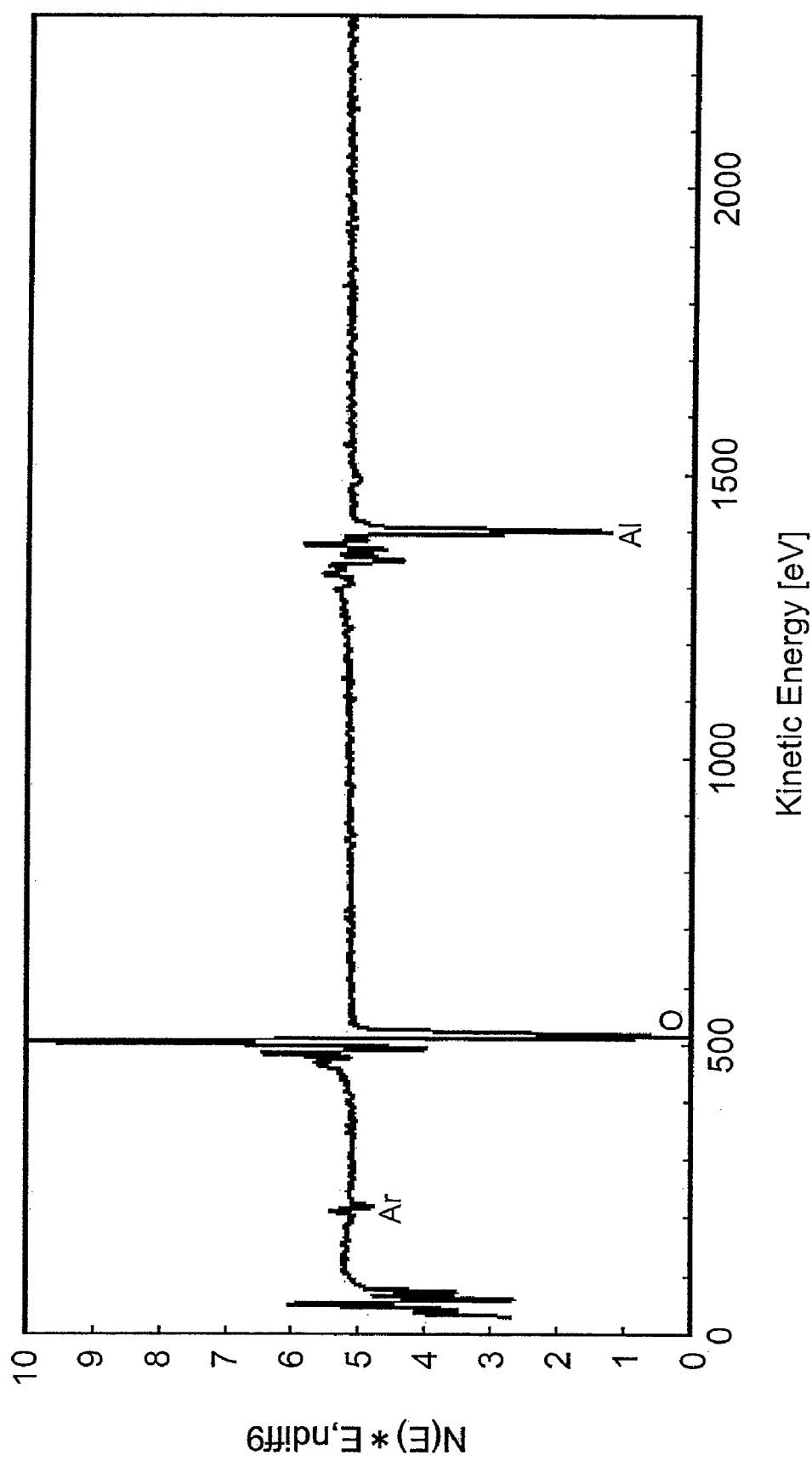
FIG. 4 is a graph showing an example of AES spectrum of the metal film in the scintillator panel in accordance with the first embodiment.

FIG. 4 is a graph showing an example of AES spectrum of the metal film in the scintillator panel in accordance with the first embodiment. This example conducts an element analysis in the thickness direction of the metal layer 18 by sputter-etching the metal film 18 with argon ions for 20 minutes. In this case, aluminum, oxygen, and argon are detected. Here, argon derives from the argon ions at the time of sputter etching, and is not an element contained in the metal film 18. Though containing oxygen, the metal film 18 can clearly be distinguished from the alumite layer 14 in view of their AES spectra forms.

Reference will be made to FIGS. 1 and 2 again. The oxide layer 20 is made of a metal oxide, $SiO_2$, $TiO_2$, or the like, for example. The oxide layer 20 may be constituted by a plurality of oxide layers made of materials different from each other, e.g., an $SiO_2$ film and a $TiO_2$ film. In one example, the thickness of the $SiO_2$ film is 80 nm while the thickness of the $TiO_2$ film is 50 nm. The thickness and number of laminated layers of the $SiO_2$ and $TiO_2$ films are determined in view of the reflectance for the wavelength of light 32 emitted from the scintillator 24. The oxide layer 20 also functions to prevent the metal film 18 from corroding.

The scintillator 24 is smaller than the aluminum film 12 when seen in the thickness direction of the aluminum substrate 12. For example, the scintillator 24 is constituted by a phosphor which converts the radiation into visible light, and is made of a columnar crystal or the like of CsI doped with Ti, Na, or the like. The scintillator 24 has a structure provided with a forest of columnar crystals. The scintillator 24 may also be made of Ti-doped NaI, Tl-doped KI, or Eu-doped LiI. A stimulable phosphor such as Eu-doped CsBr may be used in place of the scintillator 24. The thickness of the scintillator 24 is preferably 100 to 1000 µm, more preferably 450 to 550 µm. Preferably, the average column diameter of the columnar crystals constituting the scintillator 24 is 3 to 10 µm.

As explained in the foregoing, the scintillator panel 10 comprises the aluminum substrate 12; the alumite layer 14 formed on the surface of the aluminum substrate 12; the metal film 18, provided on the alumite layer 14, having a radiation transparency and a light reflectivity; the protective film 22 covering the metal film 18 and having a radiation transparency and a light transparency; and the scintillator 24 provided on the protective film 22. Therefore, the light 32 emitted from the scintillator 24 is reflected by the metal film 18, whereby the scintillator panel 10 can attain a high luminance. Since the metal film 18 and protective film 22 are provided between the alumite layer 14 and scintillator 24, the aluminum substrate 12 and scintillator 24 can be kept from reacting with each other even if the alumite layer 14 is formed with cracks, pinholes, and the like. As a consequence, the aluminum substrate 12 can be prevented from corroding. Forming the alumite layer 14 can further erase damages to the surface of the aluminum substrate 12, whereby uniform luminance and resolution characteristics can be obtained within the surface of the scintillator panel 10.

The scintillator panel 10 further comprises the radiation-transparent intermediate film 16 provided between the alumite layer 14 and metal film 18. This can flatten the surface of the alumite layer 14, thereby improving the flatness of the metal film 18. Therefore, the in-surface uniformity in reflectance of the metal film 18 improves. It can also enhance the adhesion between the alumite layer 14 and metal film 18. It can further prevent moisture, scintillator constituent materials, and the like from passing through cracks, pinholes, and the like formed in the alumite layer 14. Therefore, the aluminum substrate 12 is further prevented from corroding.

The scintillator panel 10 further comprises the oxide layer 20 covering the metal film 18 and having a radiation transparency and a light transparency. This can improve the moisture resistance of the metal film 18 and prevent the metal film 18 from being damaged. It can also enhance the reflectance of the metal film 18.

FIGS. 5A to 5C and 6A to 6D are process sectional views schematically showing an example of the method of manufacturing a scintillator panel in accordance with the first embodiment. The method of manufacturing the scintillator panel 10 will now be explained with reference to FIGS. 5A to 5C and 6A to 6D.

Figure 5A:
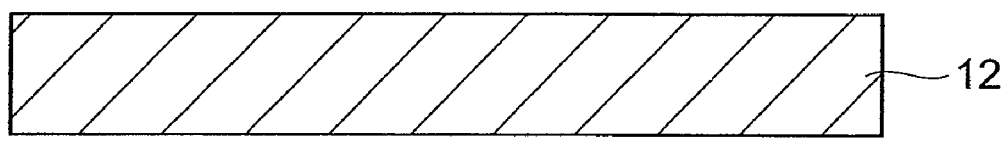
FIGS. 5A to 5C are process sectional views schematically showing an example of the method of manufacturing a scintillator panel in accordance with the first embodiment.
Figure 5B:
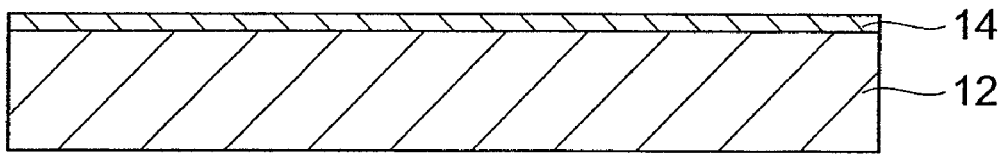

First, as shown in FIG. 5A, the aluminum substrate 12 is prepared. Subsequently, as shown in FIG. 5B, the alumite layer 14 is formed by anodic oxidation on a surface of the aluminum substrate 12. For example, the aluminum substrate 12 is electrolyzed by an anode in an electrolyte such as dilute sulfuric acid, so as to be oxidized. This forms the alumite layer 14 constituted by an assembly of hexagonal columnar cells each having a fine hole at the center. The alumite layer 14 may be dipped in a dye, so as to be colored. This can improve the resolution or enhance the luminance. After being formed, the alumite layer 14 is subjected to a sealing process for filling the fine holes.

Figure 5C:
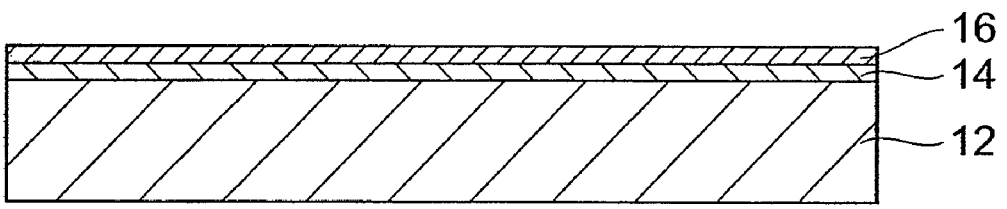
Figure 6A:
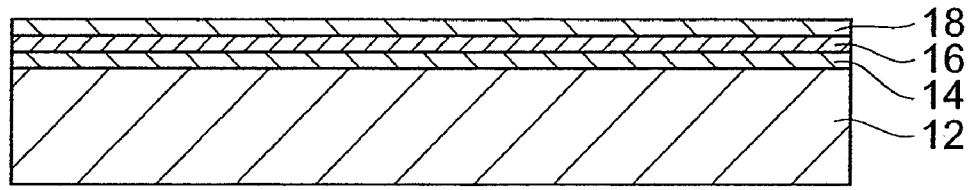
FIGS. 6A to 6D are process sectional views schematically showing the example of the method of manufacturing a scintillator panel in accordance with the first embodiment.
Figure 6B:
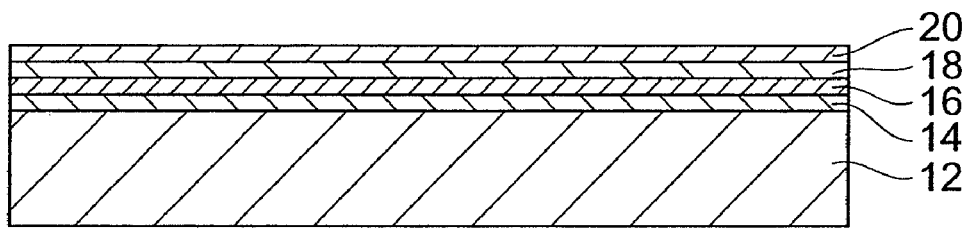
Figure 6C:
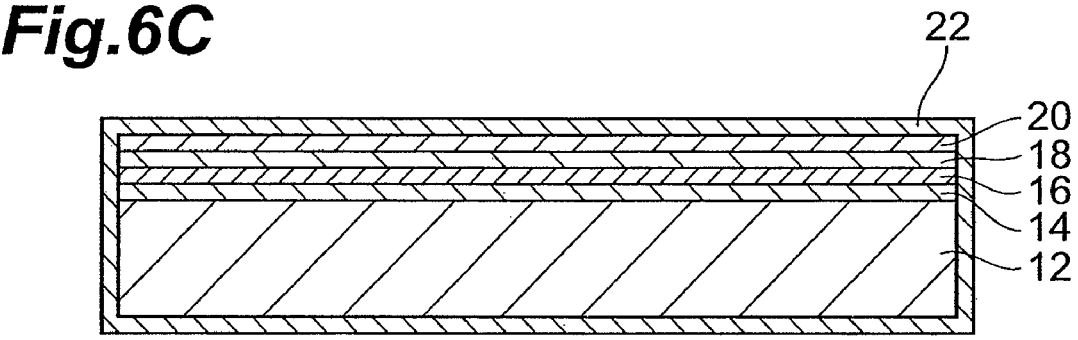
Figure 6D:
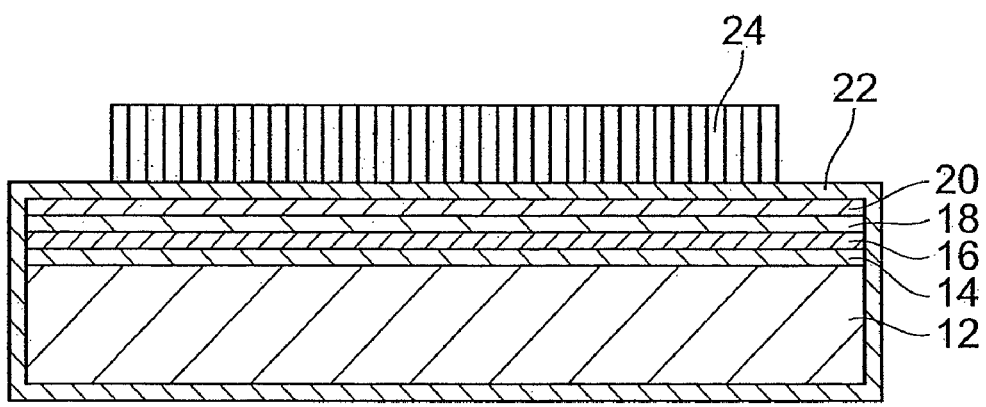

Next, as shown in FIG. 5C, the intermediate film 16 is formed on the alumite layer 14 by using CVD. Further, as shown in FIG. 6A, the metal film 18 is formed on the intermediate film 16 by using vacuum vapor deposition. The metal film 18 is made of aluminum having a purity of 99.9%, for example. Thereafter, as shown in FIG. 6B, the oxide layer 20 is formed on the metal film 18. Next, as shown in FIG. 6C, the protective film 22 is formed by using CVD so as to seal the aluminum substrate 12, alumite layer 14, intermediate film 16, metal film 18, and oxide layer 20 as a whole. Further, as shown in FIG. 6D, the scintillator 24 is formed on the protective film 22 on the oxide layer 20 by using vapor deposition. Subsequently, as shown in FIGS. 1 and 2, the protective film 26 is formed by using CVD so as to seal the aluminum substrate 12, alumite layer 14, intermediate film 16, metal film 18, oxide layer 20, protective film 22, and scintillator 24 as a whole. Thus, the scintillator panel 10 is manufactured. The sealing with the protective films 22 and 26 can be realized by lifting the side of the aluminum substrate 12 opposite from the scintillator forming surface from a substrate holder at the time of CVD. An example of such method is one disclosed in U.S. Pat. No. 6,777,690. This method lifts the aluminum substrate 12 by using pins. In this case, no protective film is formed on minute contact surfaces between the aluminum substrate 12 and the pins.

Figure 7:
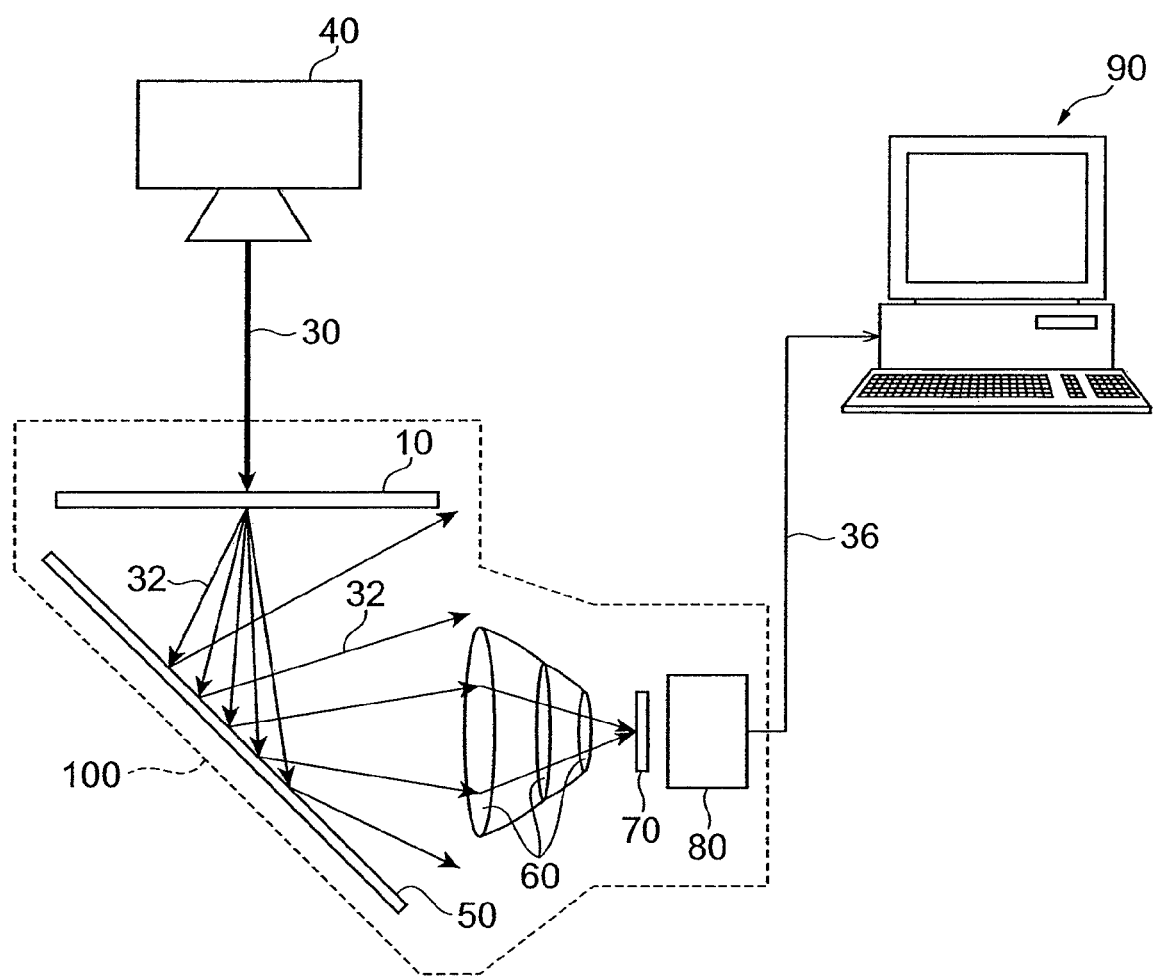
FIG. 7 is a diagram showing an example of radiation image sensor including the scintillator panel in accordance with the first embodiment.

FIG. 7 is a diagram showing an example of radiation image sensor including the scintillator panel in accordance with the first embodiment. The radiation image sensor 100 shown in FIG. 7 comprises the scintillator panel 10 and an image pickup device 70 which converts the light 32 emitted from the scintillator 24 of the scintillator panel 10 into an electric signal. The light 32 emitted from the scintillator 24 is reflected by a mirror 50, so as to be made incident on a lens 60.

The light 32 is converged by the lens 60, so as to be made incident on the image pickup device 70. One or a plurality of lenses 60 may be provided.

The radiation 30 emitted from a radiation source 40 such as x-ray source is transmitted through an object to be inspected which is not depicted. The transmitted radiation image is made incident on the scintillator 24 of the scintillator panel 10. As a consequence, the scintillator 24 emits a visible light image (the light 32 having a wavelength to which the image pickup device 70 is sensitive) corresponding to the radiation image. The light 32 emitted from the scintillator 24 is made incident on the image pickup device 70 by way of the mirror 50 and lens 60. For example, CCDs, flat panel image sensors, and the like can be used as the image pickup device 70. Thereafter, an electronic device 80 receives the electric signal from the image pickup device 70, whereby the electric signal is transmitted to a workstation 90 through a lead 36. The workstation 90 analyzes the electric signal, and outputs an image onto a display.

The radiation image sensor 100 comprises the scintillator panel 10 and the image pickup device 70 adapted to convert the light 32 emitted from the scintillator 24 of the scintillator panel 10 into the electric signal. Therefore, the radiation image sensor 100 can prevent the aluminum substrate 12 from corroding, while having a high luminance.

Figure 8:
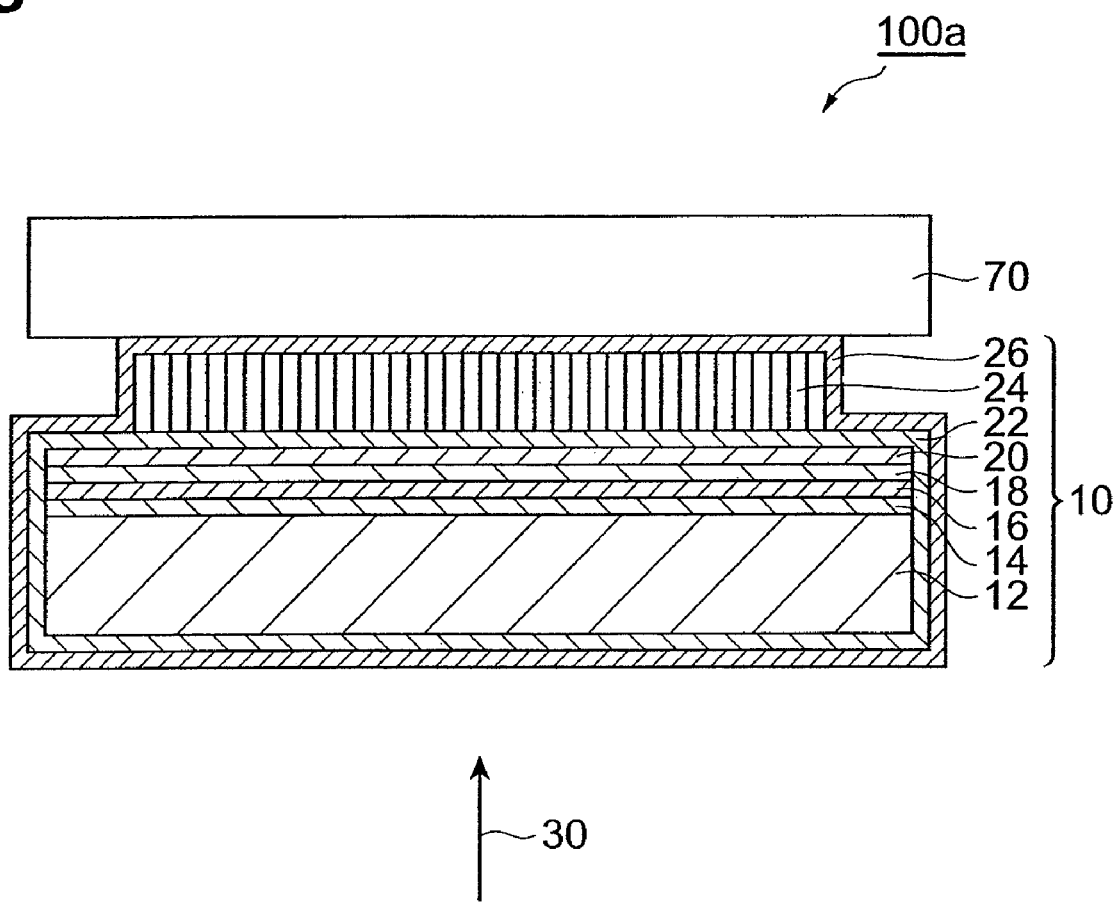
FIG. 8 is a view showing another example of radiation image sensor including the scintillator panel in accordance with the first embodiment.

FIG. 8 is a view showing another example of radiation image sensor including the scintillator panel in accordance with the first embodiment. The radiation image sensor 100a shown in FIG. 8 comprises the scintillator panel 10, and an image pickup device 70 which is arranged so as to oppose the scintillator panel 10 and adapted to convert light emitted from the scintillator 24 into an electric signal. The scintillator 24 is arranged between the aluminum substrate 12 and image pickup device 70. The light-receiving surface of the image pickup device 70 is arranged on the scintillator 24 side. The scintillator panel 10 and image pickup device 70 may be joined together or separated from each other. When joining them, an adhesive may be used, or an optical coupling material (refractive index matching material) may be utilized so as to reduce the loss of the emitted light 32 in view of the refractive indexes of the scintillator 24 and protective film 26.

The radiation image sensor 100a comprises the scintillator panel 10 and the image pickup device 70 adapted to convert the light 32 emitted from the scintillator 24 of the scintillator panel 10 into the electric signal. Therefore, the radiation image sensor 100a can prevent the aluminum substrate 12 from corroding, while having a high luminance.

Second Embodiment

Figure 9:
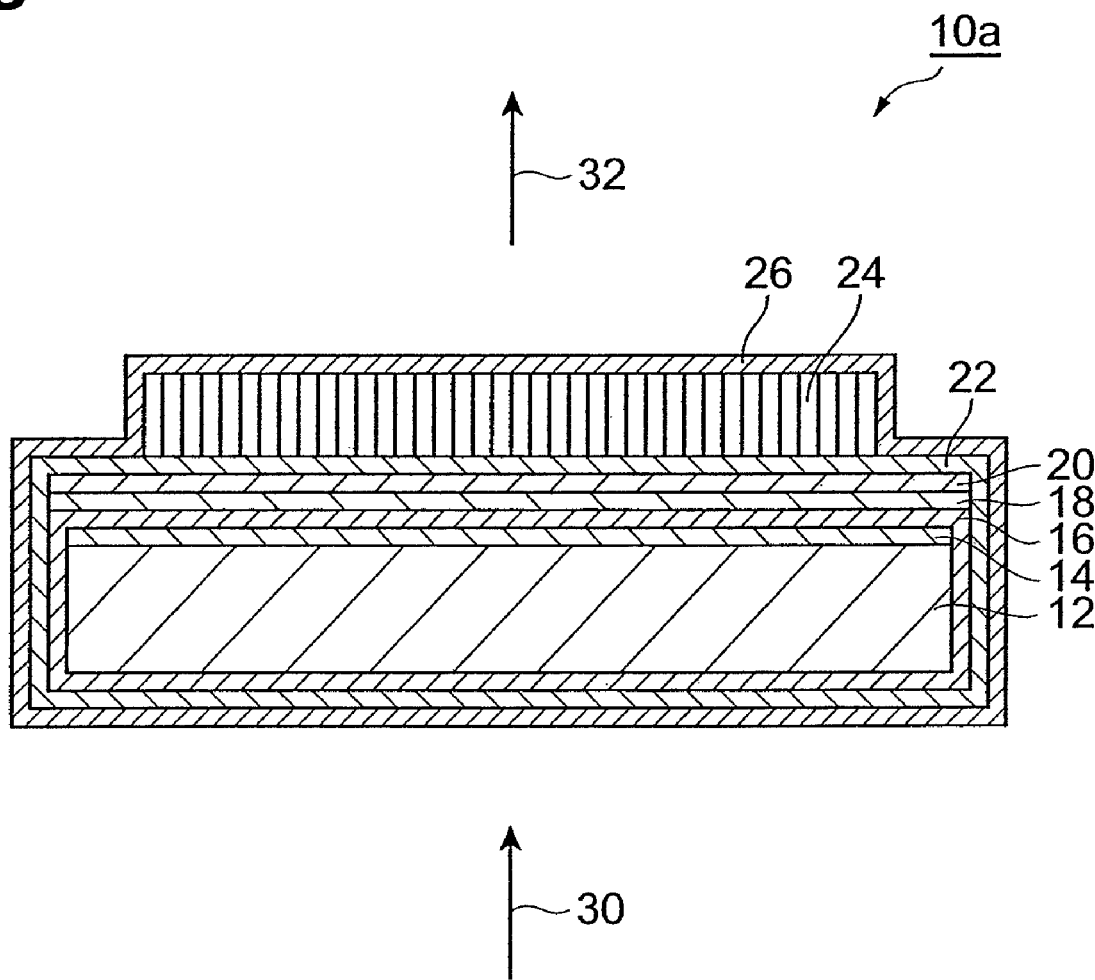
FIG. 9 is a sectional view schematically showing the scintillator panel in accordance with a second embodiment.

FIG. 9 is a sectional view schematically showing the scintillator panel in accordance with a second embodiment. The scintillator panel 10a shown in FIG. 9 has the same structure as that of the scintillator panel 10 except that the intermediate film 16 totally seals the aluminum substrate 12 and alumite layer 14. Therefore, the scintillator panel 10a not only exhibits the same operations and effects as those of the scintillator 10, but further improves the moisture resistance of the aluminum substrate 12, and thus can more reliably prevent the aluminum substrate 12 from corroding.

Third Embodiment

Figure 10:
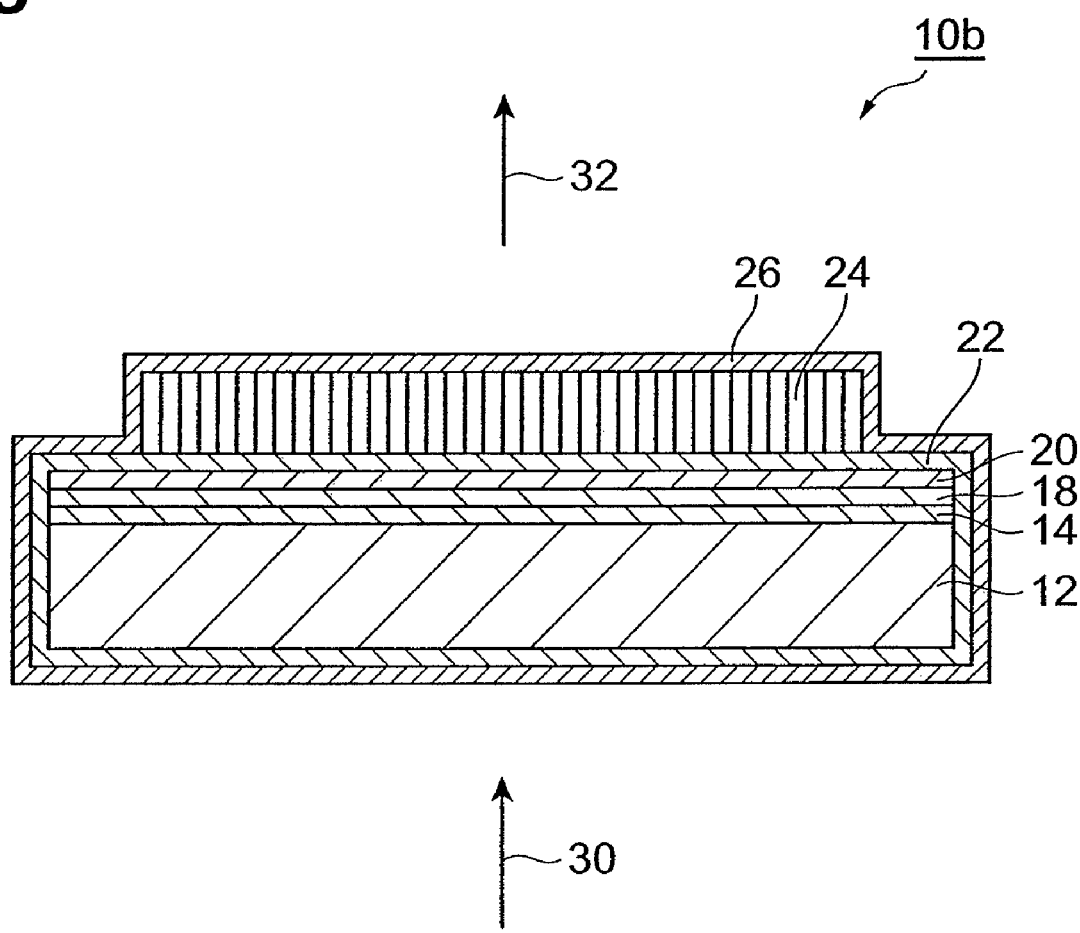
FIG. 10 is a sectional view schematically showing the scintillator panel in accordance with a third embodiment.
Figure 11:
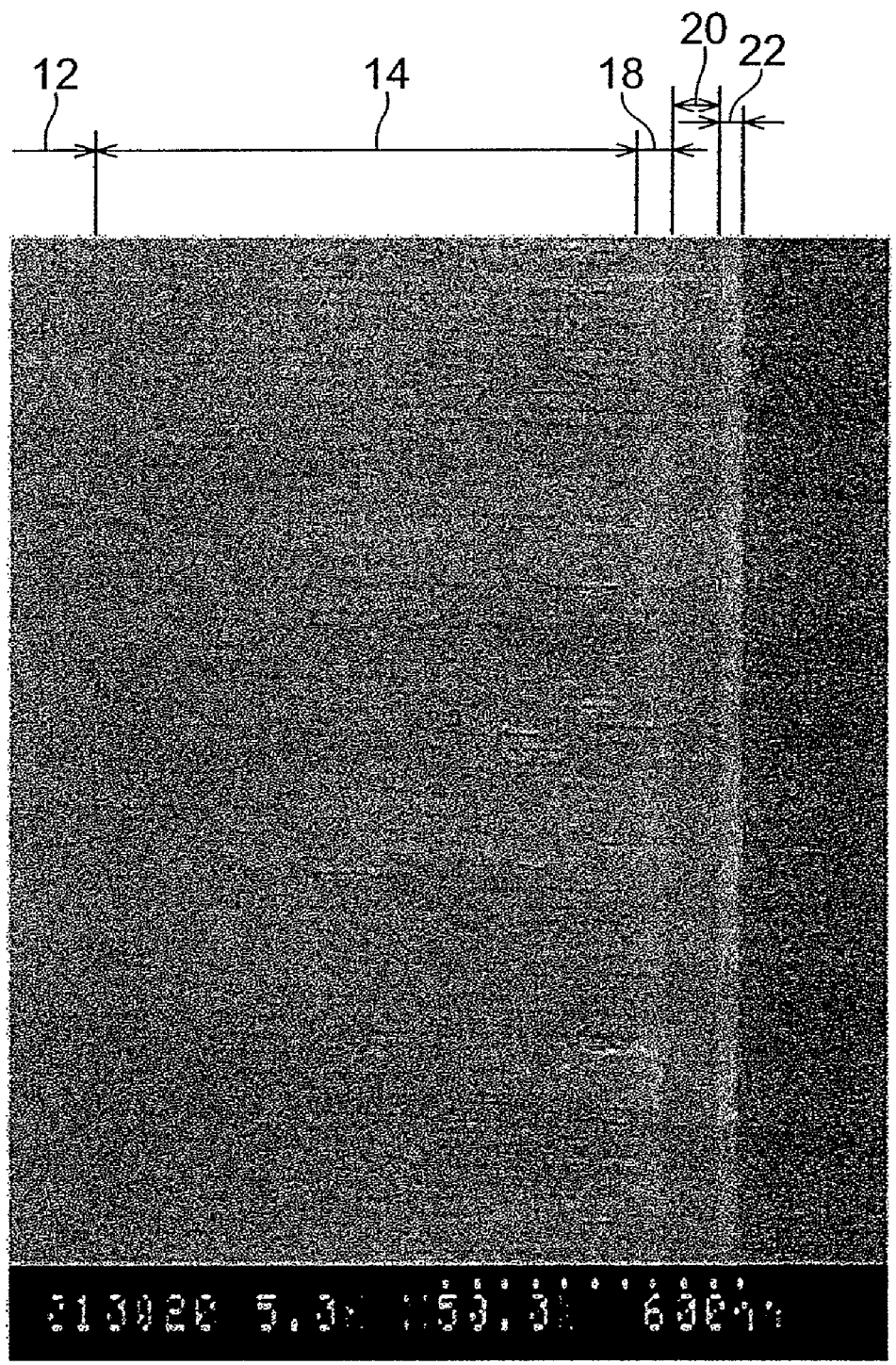
FIG. 11 is a cross-sectional SEM photograph of an example of the scintillator panel in accordance with the third embodiment.

FIG. 10 is a sectional view schematically showing the scintillator panel in accordance with a third embodiment. The scintillator panel 10b shown in FIG. 10 has the same structure as that of the scintillator panel 10 except that it lacks the intermediate film 16. Therefore, the scintillator panel 10b not only exhibits the same operations and effects as those of the scintillator 10, but can also simplify the structure. FIG. 11 is a cross-sectional SEM photograph of an example of the scintillator panel in accordance with the third embodiment.

When forming the metal film 18 on the alumite layer 14, the thickness of the metal film 18 is preferably 50 to 200 nm in view of a uniform reflection characteristic, adhesion strength, and the like of the metal film 18. Preferably, for keeping the surface state of the aluminum substrate 12 from affecting the metal film 18, the thickness of the alumite layer 14 is greater than that of the metal film 18. In one example, the thickness of the alumite layer 14 is 1000 nm.

Fourth Embodiment

Figure 12:
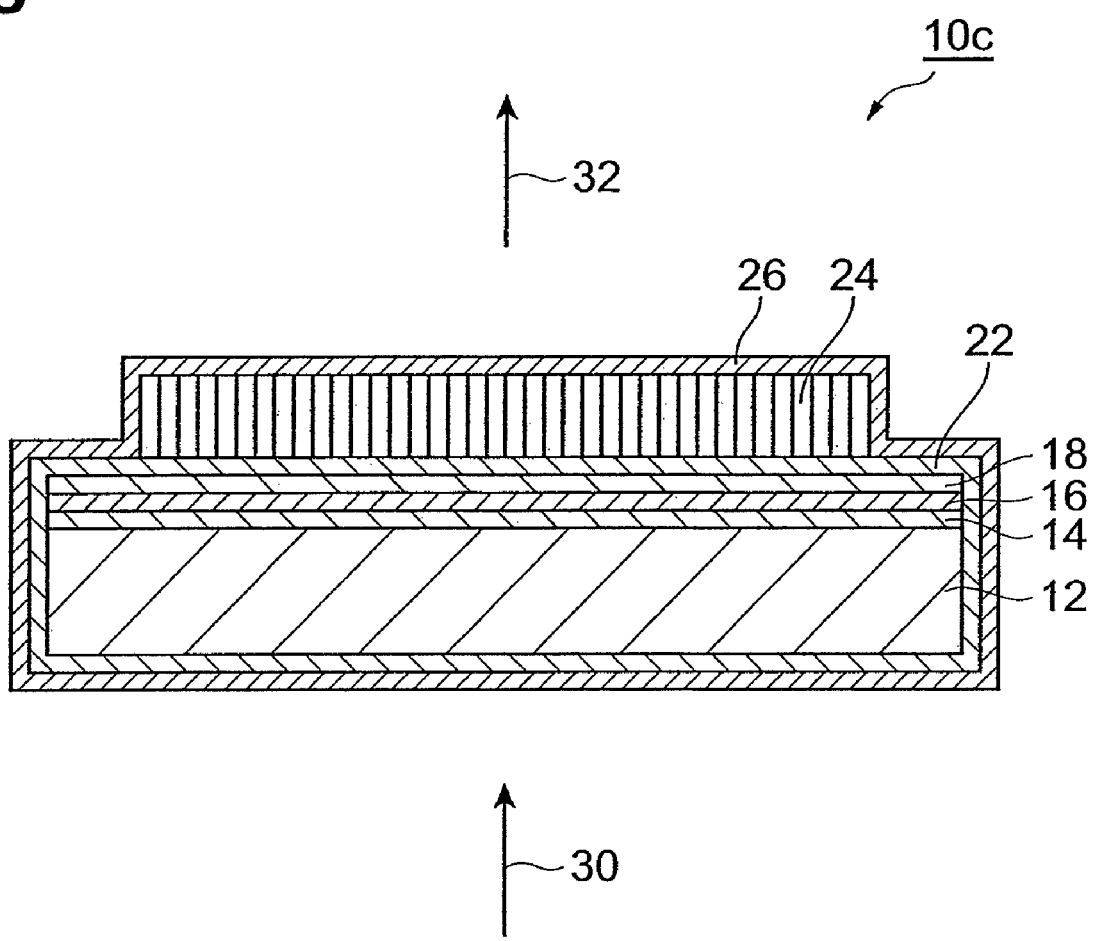
FIG. 12 is a sectional view schematically showing the scintillator panel in accordance with a fourth embodiment.

FIG. 12 is a sectional view schematically showing the scintillator panel in accordance with a fourth embodiment. The scintillator panel 10c shown in FIG. 12 has the same structure as that of the scintillator panel 10 except that it lacks the oxide layer 20. Therefore, the scintillator panel 10c not only exhibits the same operations and effects as those of the scintillator 10, but can also simplify the structure.

Fifth Embodiment

Figure 13:
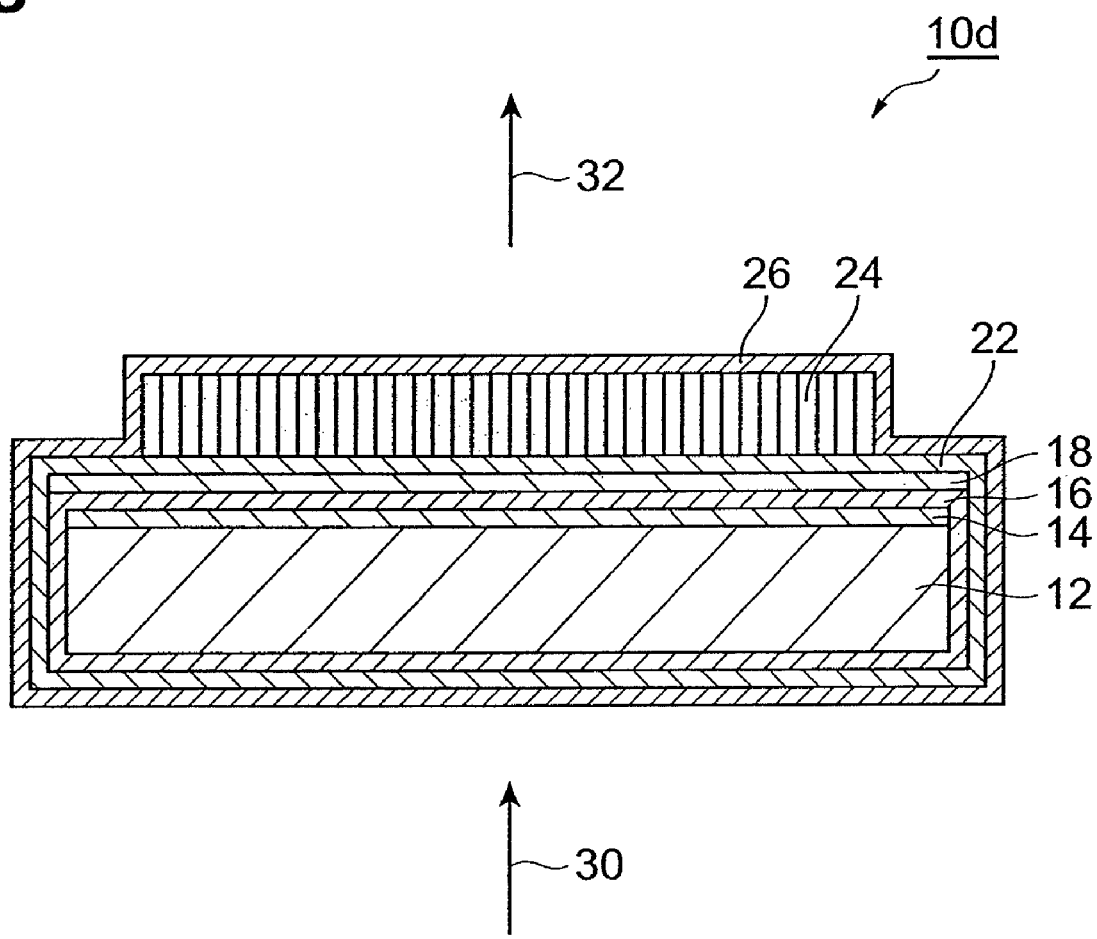
FIG. 13 is a sectional view schematically showing the scintillator panel in accordance with a fifth embodiment.

FIG. 13 is a sectional view schematically showing the scintillator panel in accordance with a fifth embodiment. The scintillator panel 10d shown in FIG. 13 has the same structure as that of the scintillator panel 10c except that the intermediate film 16 totally seals the aluminum substrate 12 and alumite layer 14. Therefore, the scintillator panel 10d not only exhibits the same operations and effects as those of the scintillator 10c, but further improves the moisture resistance of the aluminum substrate 12, and thus can more reliably prevent the aluminum substrate 12 from corroding.

Sixth Embodiment

Figure 14:
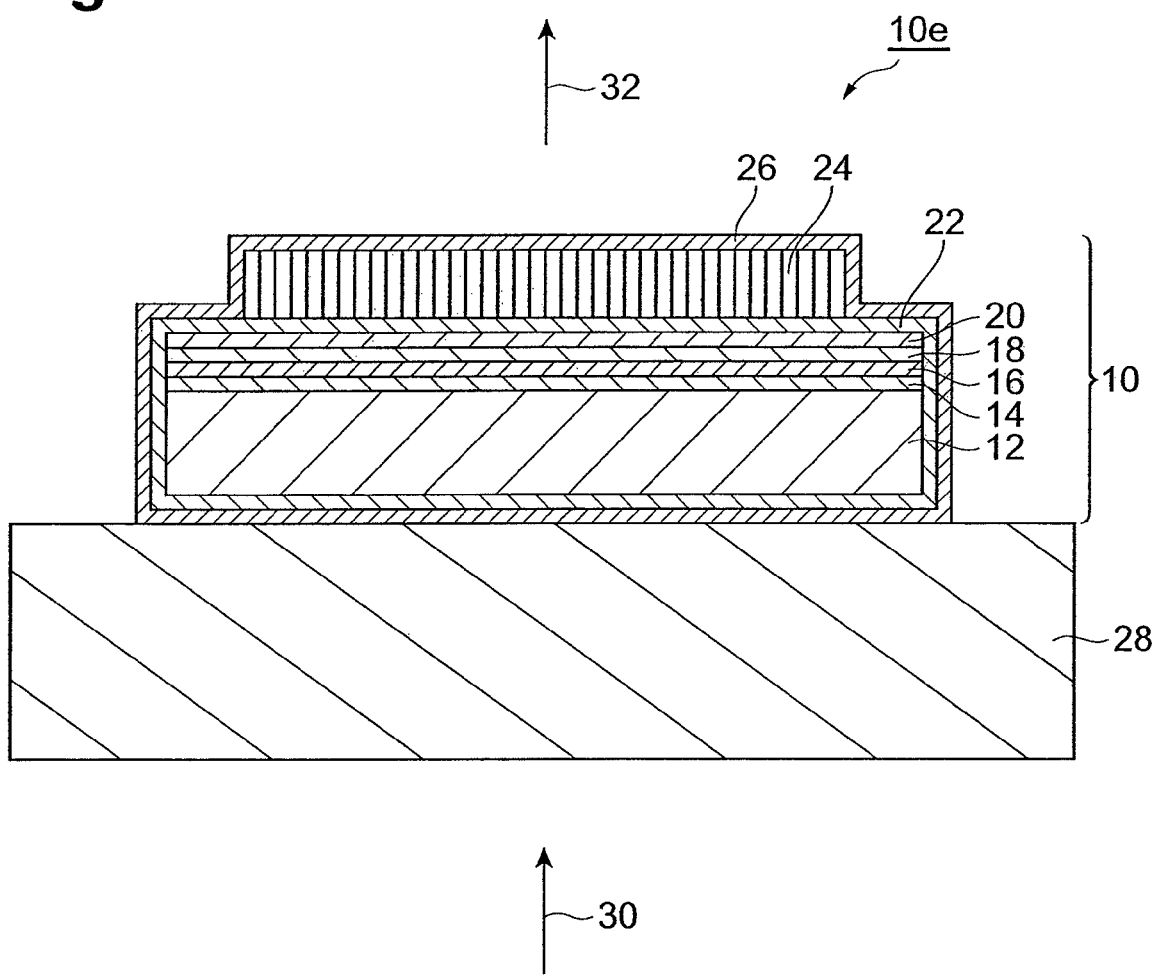
FIG. 14 is a sectional view schematically showing the scintillator panel in accordance with a sixth embodiment.

FIG. 14 is a sectional view schematically showing the scintillator panel in accordance with a sixth embodiment. The scintillator panel 10e shown in FIG. 14 further comprises a radiation-transparent reinforcement plate 28 bonded to the aluminum substrate 12 in addition to the structure of the scintillator panel 10. The aluminum substrate 12 is arranged between the reinforcement plate 28 and scintillator 24.

The reinforcement plate 28 is bonded to the aluminum substrate 12 by a double-sided adhesive tape, an adhesive, or the like, for example. Employable as the reinforcement plate 28 are (1) carbon fiber reinforced plastics (CFRP), (2) carbon boards (made by carbonizing and solidifying charcoal and paper), (3) carbon substrates (graphite substrates), (4) plastic substrates, (5) sandwiches of thinly formed substrates (1) to (4) mentioned above with resin foam, and the like. Preferably, the thickness of the reinforcement plate 28 is greater than the total thickness of the aluminum substrate 12 and alumite layer 14. This improves the strength of the scintillator panel 10e as a whole. Preferably, the reinforcement plate 28 is larger than the scintillator 24 when seen in the thickness direction of the aluminum substrate 12. Namely, it will be preferred if the reinforcement plate 28 hides the scintillator 24 when seen in the thickness direction of the aluminum substrate 12 from the reinforcement plate 28 side. This can prevent a shadow of the reinforcement plate 28 from being projected. In particular, this can prevent an image from becoming uneven because of the shadow of the reinforcement plate 28 when the radiation image 30 having a low energy is used.

The scintillator panel 10e not only exhibits the same operations and effects as those of the scintillator panel 10, but can further improve the flatness and rigidity of the scintillator panel 10e. Therefore, the scintillator panel 10e can prevent the scintillator 24 from peeling off as the aluminum substrate 12 bends. Since the radiation image sensor 100 shown in FIG. 7 uses the scintillator panel as a single unit, it is effective to employ the scintillator panel 10e having a high rigidity.

The reinforcement plate 28 may be bonded to one of the scintillator panels 10a, 10b, 10c, 10d instead of the scintillator panel 10.

Though preferred embodiments of the present invention are explained in detail in the foregoing, the present invention is not limited to the above-mentioned embodiments and the structures exhibiting various operations and effects mentioned above.

For example, the radiation image sensors 100, 100a may employ one of the scintillator panels 10a, 10b, 10c, 10d, 10e in place of the scintillator panel 10.

The scintillator panel 10 is not required to have both of the intermediate film 16 and oxide layer 20. The scintillator panels 10, 10a, 10b, 10c, 10d, 10e may be free of the protective film 26.

Though the above-mentioned embodiments exemplify the radiation image conversion panel by the scintillator panel, a stimulable phosphor (an example of a converting part adapted to convert a radiation image) may be used in place of the scintillator 24, whereby an imaging plate as the radiation image conversion panel can be made. The stimulable phosphor converts the radiation image into a latent image. This latent image is scanned with laser light, so as to read a visible light image. The visible light image is detected by a detector (photosensor such as line sensor, image sensor, and photomultiplier).

What is claimed is:

1. A radiation detector comprising:
    a scintillator panel comprising:
        a support substrate comprising an incidence surface for receiving a radiation image transmitted through an object to be inspected, the support substrate transmitting the radiation image; and
        a scintillator for converting the radiation image into a light image, the scintillator comprising a light emitting surface emitting the light image, the scintillator formed on a surface of the support substrate opposite to the incidence surface of the support substrate;
        wherein the support substrate comprises an aluminum substrate; an aluminum oxide layer formed on a surface of the aluminum substrate; a metal film, provided on the aluminum oxide layer, having a light reflectivity; a metal oxide layer provided on the metal film; and a protective film covering the metal oxide layer and having a light transparency, at least a portion of the protective film being positioned between the metal oxide layer and the scintillator;
    a reflective mirror for reflecting the light image emitted from the light emitting surface of the scintillator panel; and
    an image pickup device for converting the light image reflected from the reflective mirror into an electric signal, wherein the light image emitted from the scintillator panel has a wavelength to which the image pickup device is sensitive;
    the radiation detector further comprising an oxide layer covering the metal film and having a radiation transparency and a light transparency, the oxide layer comprising an $SiO_2$ film and a $TiO_2$ film.

2. A radiation detector according to claim 1, further comprising an intermediate film provided between the aluminum oxide layer and the metal film.

3. A radiation detector according to claim 1, further comprising a protective film protecting the scintillator.

4. A radiation detector according to claim 1, further comprising a radiation-transparent reinforcement plate on the incidence surface of the support substrate.

5. A radiation detector according to claim 4, wherein a thickness of the reinforcement plate is greater than a thickness of the support substrate.

6. A radiation detector according to claim 4, wherein the reinforcement plate is larger than the support substrate and hides the support substrate when seen in a thickness direction of the support substrate.

7. A radiation detector comprising:
    a scintillator panel comprising:
        a support substrate comprising an incidence surface for receiving a radiation image transmitted through an object to be inspected, the support substrate transmitting the radiation image; and
        a scintillator for converting the radiation image into a light image, the scintillator comprising a light emitting surface emitting the light image, the scintillator formed on a surface of the support substrate opposite to the incidence surface of the support substrate;
        wherein the support substrate comprises an aluminum substrate; an aluminum oxide layer formed on a surface of the aluminum substrate; a metal film, provided on the aluminum oxide layer, having a light reflectivity; a metal oxide layer provided on the metal film; and a protective film covering the metal oxide layer and having a light transparency, at least a portion of the protective film being positioned between the metal oxide layer and the scintillator; and
    an image pickup device for converting the light image emitted from the light emitting surface of the scintillator into an electric signal, wherein the light image emitted from the scintillator panel has a wavelength to which the image pickup device is sensitive, and the image pickup device is arranged so as to oppose the light emitting surface of the scintillator;
    the radiation detector further comprising an oxide layer covering the metal film and having a radiation transparency and a light transparency, the oxide layer comprising an $SiO_2$ film and a $TiO_2$ film.

8. A radiation detector according to claim 7, further comprising an intermediate film provided between the aluminum oxide layer and the metal film.

9. A radiation detector according to claim 7, further comprising a protective film protecting the scintillator.

10. A radiation detector according to claim 7, further comprising a radiation-transparent reinforcement plate on the incidence surface of the support substrate.

11. A radiation detector according to claim 10, wherein a thickness of the reinforcement plate is greater than a thickness of the support substrate.

12. A radiation detector according to claim 10, wherein the reinforcement plate is larger than the support substrate and hides the support substrate when seen in a thickness direction of the support substrate.

13. A radiation detector according to claim 7, wherein the scintillator panel and image pickup device are joined together.

14. A radiation detector according to claim 7, wherein the scintillator panel directly transmits the light image to the image pickup device.

15. A radiation image conversion panel comprising:

an aluminum substrate;

an aluminum oxide layer formed on a surface of the aluminum substrate;

a metal film, provided on the aluminum oxide layer, having a light reflectivity, at least a portion of the aluminum oxide layer being positioned between the aluminum substrate and the metal film;

a protective film covering the metal film and having a light transparency, at least a portion of the metal film being positioned between the aluminum oxide layer and the protective film;

a converting part provided on the protective film and adapted to convert a radiation image, the converting part comprising a light emitting surface of the radiation image conversion panel, and at least a portion of the protective film being positioned between the metal film and the converting part; and an oxide layer covering the metal film and having a radiation transparency and a light transparency, the oxide layer comprising an $SiO_2$ film and a $TiO_2$ film.

16. A scintillator panel comprising:

an aluminum substrate comprising a radiation receiving surface of the scintillator panel;

an aluminum oxide layer formed on a surface of the aluminum substrate other than the radiation receiving surface;

a metal film, provided on the aluminum oxide layer, having a radiation transparency and a light reflectivity, at least a portion of the aluminum oxide layer being positioned between the aluminum substrate and the metal film;

a protective film covering the metal film and having a radiation transparency and a light transparency, at least a portion of the metal film being positioned between the aluminum oxide layer and the protective film;

a scintillator provided on the protective film, the scintillator comprising a light emitting surface of the scintillator panel, and at least a portion of the protective film being positioned between the metal film and the scintillator; and an oxide layer covering the metal film and having a radiation transparency and a light transparency, the oxide layer comprising an $SiO_2$ film and a $TiO_2$ film.

17. A radiation image sensor comprising:

a radiation image conversion panel including an aluminum substrate; an aluminum oxide layer formed on a surface of the aluminum substrate; a metal film, provided on the aluminum oxide layer, having a light reflectivity, at least a portion of the aluminum oxide layer being positioned between the aluminum substrate and the metal film; a protective film covering the metal film and having a light transparency, at least a portion of the metal film being positioned between the aluminum oxide layer and the protective film; and a converting part provided on the protective film and adapted to convert a radiation image, the converting part comprising a light emitting surface of the radiation image conversion panel, and at least a portion of the protective film being positioned between the metal film and the converting part;

an image pickup device for converting light emitted from the light emitting surface of the converting part of the radiation image conversion panel into an electric signal; and an oxide layer covering the metal film and having a radiation transparency and a light transparency, the oxide layer comprising an $SiO_2$ film and a $TiO_2$ film.

* * * * *